United States Patent [19]

Fritsch

[11] Patent Number: 4,662,025
[45] Date of Patent: May 5, 1987

[54] CLEANING DEVICE

[75] Inventor: Joseph F. Fritsch, Dublin, Ireland

[73] Assignee: Roxanne Yvonne Fritsch, Dublin, Ireland; a part interest

[21] Appl. No.: 829,360

[22] Filed: Feb. 14, 1986

[30] Foreign Application Priority Data

Feb. 14, 1985 [IE] Ireland .................................. 357/85
Sep. 17, 1985 [IE] Ireland .................................. 2294/85

[51] Int. Cl.⁴ .............................................. G11B 3/58
[52] U.S. Cl. ........................................ 15/246; 15/28; 15/97 R; 360/137; 369/72
[58] Field of Search ............... 15/28, 29, 210 R, 97 R, 15/246, 209 R, 21 R; 369/72, 74; 360/128, 137

[56] References Cited

U.S. PATENT DOCUMENTS

3,619,954  11/1971  Miller .................................. 15/28 X
4,332,050   6/1982  Okuda ............................... 369/72 X
4,486,916  12/1984  Allsop ................................ 15/246
4,556,433  12/1985  Clausen .............................. 369/72

Primary Examiner—Edward L. Roberts
Attorney, Agent, or Firm—Sughrue, Mion, Zinn, Macpeak and Seas

[57] ABSTRACT

A cleaning device for cleaning a compact disc record when the record is in its case comprises a housing rotatable about a spindle for engaging the central portion of the base of the record case. A cleaning member with soft bristles is rotatable in the housing and connected to the spindle through a gear train within the housing. The cleaning member is tiltable relative to the housing to ensure even distribution of pressure over the cleaning surface of the cleaning member. Resilient members on the carrier member bear on a frictionless ring of the housing to accommodate tilting of the cleaning member.

19 Claims, 13 Drawing Figures

CLEANING DEVICE

BACKGROUND TO THE INVENTION

1. Field of the Invention

The present invention relates to a cleaning device for a disc record, and in particular, though not limited to, a cleaning device for a compact disc record; it could also be used for cleaning a video disc.

2. Discussion of the Prior Art

To obtain good quality sound reproduction from a disc record or a compact disc record, it is essential that the surface of the record should be clean. This is particularly important in the case of a compact disc record. Compact disc records operate on the reflection of a laser beam from the back surface of the record, thus any particles of dirt, dust, or hairs or the like on the front surface of the record will lead to sound distortion. Furthermore, as is known it is essential that when cleaning a compact disc record that the strokes of the cleaning action should be essentially in a radial direction, so that in the event that scratching should occur it will be radial rather than circumferential scratching. This is necessary because of the way the digital information is recorded on the disc.

Furthermore, to reduce the risk of scratching and ensure an even consistent cleaning, it is desirable that the pressure between the cleaning surface of the cleaning device and the compact disc should be evenly distributed over the cleaning surface. Unfortunately, this has not been possible in devices known heretofore. In general, in these known devices, the pressure tends to be concentrated in one area of the cleaning surface, usually towards the edge of one side. This area is usually determined by the way the device is gripped.

A further problem with most known disc record cleaning device is that they tend to use a cloth based cleaning member, in other words, they tend to provide a cleaning member with a substantially smooth surface. The disadvantage of these devices is that small particles of dirt or grit get entrapped between the smooth surface of the cleaning member and the record, thereby scratching the surface of the record. Furthermore, where the cleaning action is circumferential, circumferential scratching is caused.

Furthermore, compact discs have a relatively soft surface, which, unless great care is taken, can be damaged as a result of normal handling. Thus, another problem with known compact disc cleaners is that a considerable amount of handling of the disc is required during cleaning. For example, in certain cases, the disc is held in one's hand while being cleaned. This, needless to say, carries a considerable risk of damage to the disc. Other devices require the compact disc to be transferred from their case into a specially prepared case for the cleaning device. Needless to say, this additional handling also carries a consequent risk of damage to the disc.

There is therefore a need for a cleaning device for cleaning a compact record, and further, there is a need for a cleaning device for cleaning any type of disc record, which overcomes the problems of known devices.

The present invention is directed towards providing such a cleaning device.

OBJECTS OF THE INVENTION

One object of the invention is to provide a cleaning device which can be used on a compact disc record, or indeed, any other disc record which reduces the risk of damage, and in particular, scratching of the record during cleaning. Another object of the invention is to provide a cleaning device in which the pressure between the cleaning surface and the record is substantially evenly distributed over the cleaning surface of the device. Another object of the invention is to provide a cleaning device which avoids circumferential scratching of the record. It is also an object of the invention to provide a cleaning device which cleans with substantially radial strokes. A further object of the invention is to provide a cleaning device which, should grit become entrapped in the cleaning surface of the cleaning device, scratching is either avoided or the possibility of scratching occuring is considerably reduced. Another object of the invention is to provide a cleaning device which gives a warning should excess pressure be applied to the device during cleaning. A further object of the invention is to provide a simple and easily used device which reduces handling of the record during cleaning to a minimum. Another object of the invention is to provide a cleaning device which is relatively easily manufactured, and also which is relatively inexpensive.

SUMMARY OF THE INVENTION

According to the invention there is provided a disc record cleaning device comprising a housing rotatable about an axis which in use, coincides with the rotational axis of the record, and a cleaning member mounted in the housing to wipe the record as the housing rotates, the cleaning member being mounted in the housing for tilting relative to the housing.

In one embodiment of the invention, the cleaning member is rotatably mounted in the housing about an axis spaced apart from the rotational axis of the housing, the rotational axis of the cleaning member being tiltable relative to the rotational axis of the housing.

Preferably, a resilient member is mounted between the housing and the cleaning member to accommodate tilting of the cleaning member.

Advantageously, the cleaning member comprises a circular disc-like member, a plurality of resilient members being circumferentially spaced about the cleaning member.

In one embodiment of the invention, a plurality of circumferentially spaced openings are provided in the cleaning member, and an elongated resilient member extends from the cleaning member into each opening, the free end of the resilient member extending upwardly to engage a bearing surface on the housing.

In another embodiment of the invention, three openings are provided, spaced apart by 120° to each other.

Advantageously, the cleaning member rotatably engages the housing by three circumferentially spaced fingers at 120°, which rotatably engage an opening in the housing, the fingers being slidable in the opening and engaging the opening with a snap-fit action.

In another embodiment of the invention, a knob is rotatably mounted in the housing, the rotational axis of the knob intersecting the rotational axis of the cleaning member substantially at a point about which the cleaning member axis tilts.

In a further embodiment of the invention, indicating means is provided to indicate when the pressure being applied to the housing is excessive.

Preferably, the cleaning member comprises a brush member.

Additionally, the invention provides a cleaning device for cleaning a compact disc in a standard compact disc case of the type in which a compact disc is normally sold, the compact disc case being of the type having a base to support the compact disc, a lid pivotal on the base, and a central portion in the base to engage the central hold of the compact disc, said central portion having an opening and splines extending upwardly from the rim of the opening to engage the compact disc, the cleaning device comprising a housing, a spindle rotatable in the housing to engage the central opening in the compact disc case, the spindle defining an axis about which the housing is rotatable, a cleaning member rotatably mounted on the housing about an axis spaced apart from the rotational axis of the housing, the rotational axis of the cleaning member being tiltable relative to the rotational axis of the housing, and a resilient member mounted between the housing and the cleaning member to accommodate tilting of the cleaning member.

ADVANTAGES OF THE INVENTION

The advantages of the invention are many. However, one particularly important advantage of the invention is that it considerably reduces the risk of damage and scratching to a compact disc, or indeed, to any disc record, such as for example, a conventional phonograph record, a video disc record, or the like. Furthermore, where scratching may occur, any scratches will be in a radial direction rather than a circumferential direction. This is particularly important in the case of a compact disc record, since circumferential scratching on a compact disc record can lead to the loss of information on the disc as a result of the way the data is recorded on the disc. A particular advantage of the invention is that the pressure between the cleaning surface of the cleaning member and the compact disc is substantially evenly distributed over the cleaning surface irrespective of the direction of the pressure applied by the user. This further assists in reducing scratching. This is achieved by virtue of the fact that the cleaning member can tilt in use relative to the housing, and furthermore, by virtue of the fact that resilient members are provided between the cleaning member and the housing to accommodate tilting. Furthermore, because the axis of the knob and that of the cleaning member substantially coincide, even distribution of the pressure over the cleaning surface is further facilitated. Furthermore, because of the fact that the cleaning member rotates as the housing of the device is rotating, the cleaning strokes are substantially radially directed across the record surface. Where the cleaning member rotates in the opposite direction to the direction of rotation of the housing, virtually all the cleaning action is caused by radial strokes. Additionally, where the brush member is of annular shape, any circumferential components of motion of the cleaning member are almost totally eliminated.

Another advantage of the invention is achieved when the cleaning member is provided by brush bristles. The advantage of this is that should a piece of grit become entrapped between the cleaning member and the compact disc, the grit in general will work up through the bristles thereby away from the surface of the compact disc.

Furthermore, when the device is provided with an indicating means to indicate excess pressure, a further advantage is achieved in that once excessive pressure is being applied, a warning is given and the user can reduce the pressure being applied. Furthermore, another advantage of the invention is that an easily manufactured and a relatively inexpensive device is provided.

These and other objects and advantages will be readily apparent from the following description of a preferred embodiment thereof, given by way of example only, with reference to the accompanying drawings.

DETAILED DESCRIPTION OF THE INVENTION

Referring to the drawings there is provided a cleaning device according to the invention, indicated generally by the reference numeral 1, which in this case is for cleaning a compact disc record 2 when mounted in its case 3. The case 3 is a standard case in which compact discs are normally sold and comprises a base 4 with a lid 5 pivotal at 6. A central portion 7 with a central opening 8 is provided on the base 4. A plurality of spline-type projections 9 extend upwardly from the periphery of the opening 8 to engage the compact disc record 2.

The cleaning device 1 comprises a housing 12 of injection moulded plastics material formed in two identical halves 14, which engage each other with a friction-fit action. Integrally moulded plugs 15 in the halves 14 of the housing 12 engage corresponding receivers 16 in the other half 14 to retain the halves 14 together with the friction-fit action.

Figure 10:
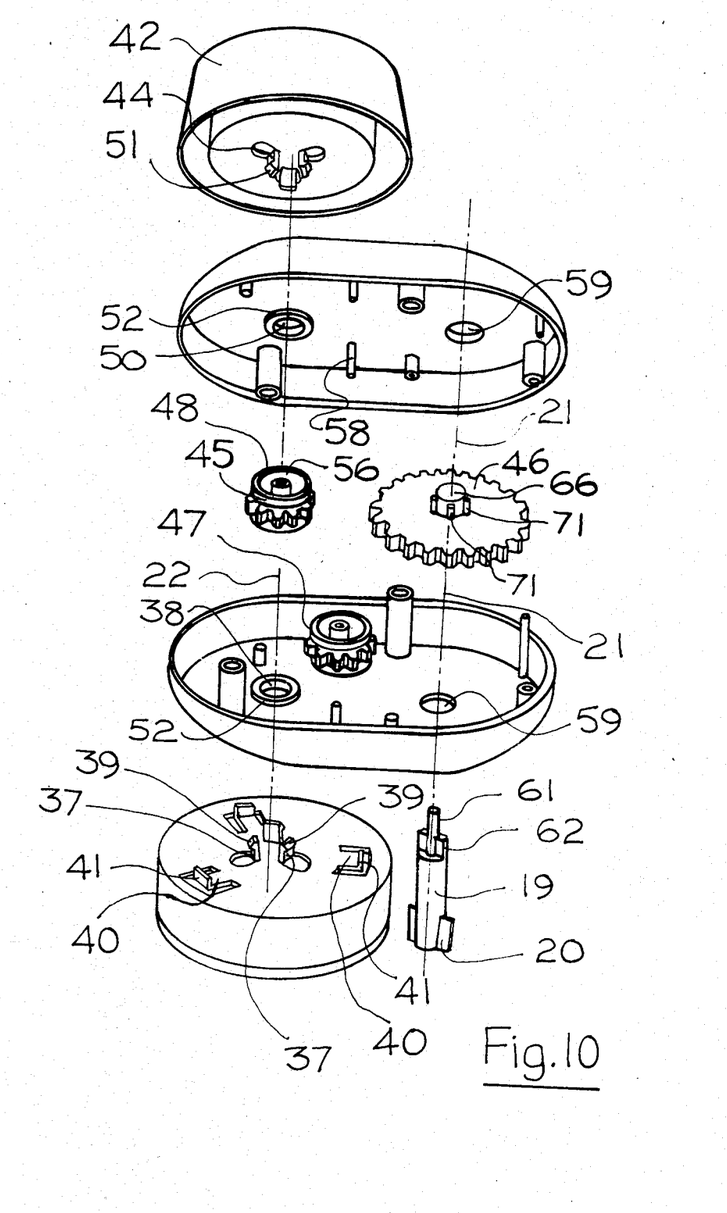
FIG. 10 is a fully exploded perspective view of the cleaning device of FIG. 1.
Figure 11:
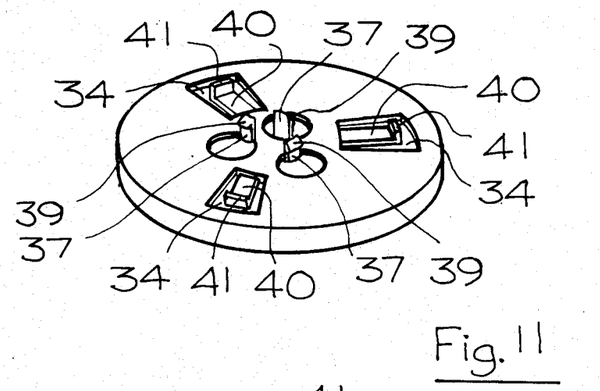
FIG. 11 is a perspective view of a detail of the device of FIG. 1.
Figure 12:
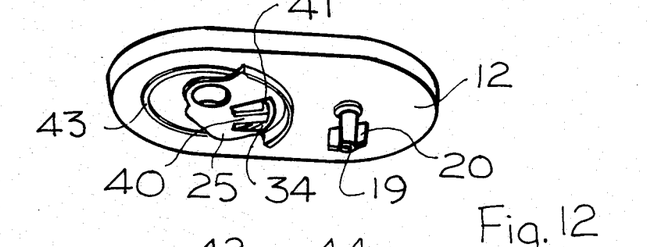
FIG. 12 is a perspective view of a further detail of the device of FIG. 1.

A cleaning member 18 which will be described below, for cleaning the surface of the record is rotatable in the housing 12. A spindle 19 of injection moulded plastics material is also rotatable in the housing 12 and engages the central opening 8 in the record case 3. A pair of splines 20 on the spindle 19 engage the splines 9 in the opening 8. As can be seen, the housing 12 is rotatable about the spindle 19 and the axis 21 of the spindle 19 thus forms the rotational axis of the housing 12. Also as can be seen, the rotational axis 22 of the cleaning member 18 is spaced apart from the axis 21 of the spindle, see FIG. 10. A gear train 23 which is also described below drives the cleaning member, in use, in the direction of the arrow A when the housing is rotated in the opposite direction, namely, the direction of the arrow B.

Figure 13:
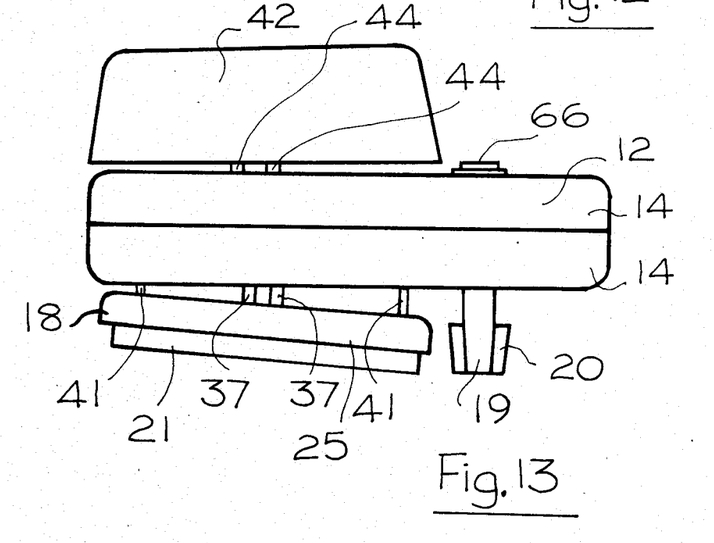
FIG. 13 is a side view of the device of FIG. 1 in use.

The cleaning member 18 comprises a carrier member 25, a brush support 26, both of injection moulded plastics material, and a brush member 27. The brush member 27 is of annular disc shape and comprises a woven backing sheet 29 from which a plurality of soft bristles 30 extend. A self-adhesive backing 31 on the backing sheet 29 bonds the backing sheet 29 to the brush support 26. Three plugs 32 extending from the brush support 26 engage corresponding receivers 33 in the carrier member 25 with a press-fit action. Three fingers 37 integrally moulded with the carrier members 25 extend upwardly and rotatably engage an opening 38 in the housing 12. The fingers 37 are also slidable in the opening 38 and clearance is provided between the fingers 37 and the opening 38. Pips 39 are provided on the fingers 37, so that the fingers 37 engage the opening 38 with a snap-fit action. By virtue of the fact that clearance is provided between the fingers and the opening, and also the fact that the fingers are slidable, the cleaning member 18 can tilt relative to the housing, this facilitates the even distribution of pressure over the brush members 27. Three resilient members, in this case provided by elongated leaf members 40 integrally moulded with the carrier member 25 extend into openings 34 in the carrier 25. As can be seen the openings 34 are arranged at 120° to each other. The resilient members 40 terminate in lugs 41, which bear on a smooth annular substantially frictionless bearing surface 43 on the housing 12. Thus, the resilient members 40 as can be seen in FIG. 13 accomodate tilting of the cleaning member 18.

A hand knob 42 rotatably engages the housing 12 by means of fingers 44 substantially similar to the fingers 37 which rotatably engage an opening 50 on the housing 12. The fingers 45 are substantially similar to the fingers 37 in the carrier member 25. Pips 51 on the fingers 44 ensure a snap-fit action between the fingers 44 and the opening 50. As can be seen the rotational axis of the knob coincides with the rotational axis of the carrier member 18, and when the carrier member 18 tilts, the axis of the knob intersects the axis of the carrier member at the point about which the axis tilts. This further helps to ensure that the pressure being applied by the user to the knob is directed along the axis of the cleaning member and that the pressure is thus, relatively evenly distributed over the cleaning member.

Figure 9:
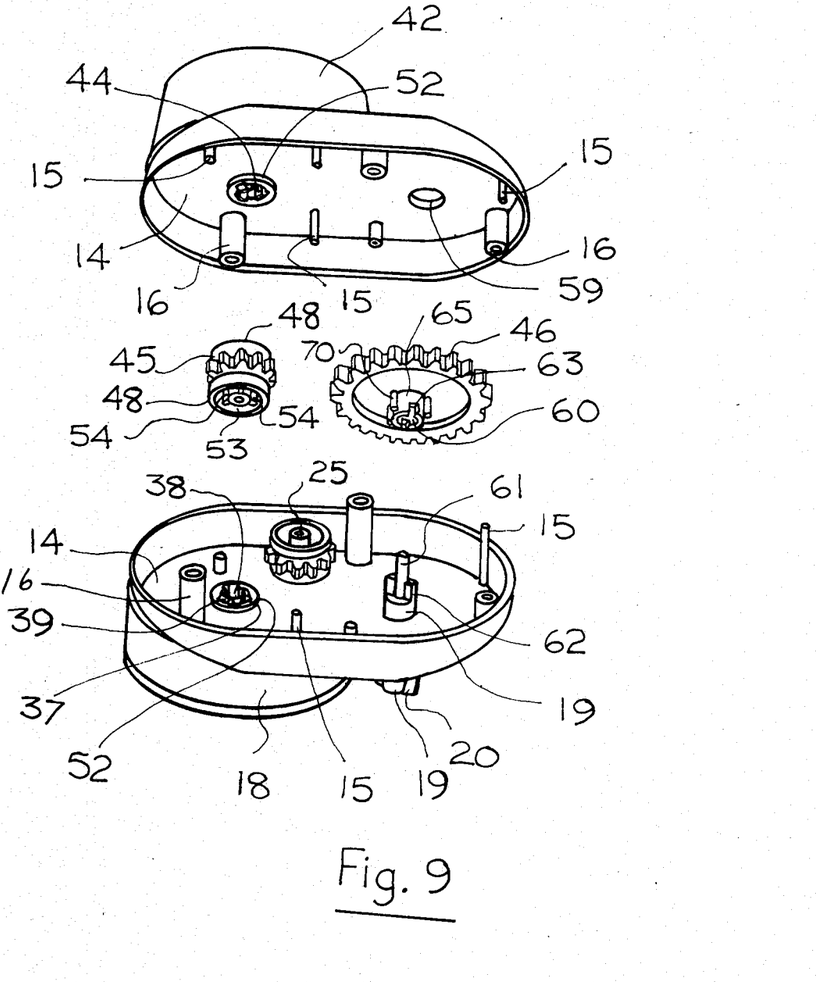
FIG. 9 is a partly exploded perspective view of the cleaning device of FIG. 1.

The gear train 23 in this case comprises three gears, all of injection moulded plastics material, namely a cleaning member gear 45 associated with the cleaning member 18, a spindle gear 46 associated with the spindle 19, and an intermediate gear 47 meshing between the cleaning member gear 45 and the spindle gear 46. Rims 48 on each side of the cleaning member gear 45 rotatably engage corresponding rims 52 around the openings 38 and 50, see FIGS. 9 and 10. The fingers 37 of the carrier member 25 project into the housing as can be seen in FIG. 9 to loosely engage recesses 53 in the gear 45 so that the gear 45 rotates with the cleaning member 18. The fact that the fingers 37 engage the recesses 53 loosely further accommodates tilting of the carrier member 18. The recesses 53 are formed by dividers 54 integrally moulded with the gear 45. A continuous annular recess 56 is provided on the other side of the gear 45 to clear the fingers 44 of the knob 42, so that the knob 42 can rotate independently of the cleaning member 18, and the gear 45. The intermediate gear is rotatable on a pair of spindles 58 integrally moulded with the halves 14 of the housing 12. For ease of manufacture both the cleaning member gear 45 and the intermediate gear 47 are identical.

The spindle gear 46 is rotatable in openings 59 in the halves 14 of the housing 12. An axial recess 60 is provided in a stub shaft 65 on one side of the spindle gear 46 to engage a shaft 61 extending from the spindle 19. Keys 62 on the shaft 61 engage corresponding keyways 63 in the recess 60 of the spindle gear 46. A stub shaft 66 on the other side of the spindle gear 46 rotatably engages one of the openings 59 while the spindle 19 rotatably engages the other opening 59. Thus, the spindle gear 46 is fast with the spindle 19 and rotatably engages the housing 12. Projections 70 and 71 on the stub shaft 65 act as spacers for aligning the spindle gear 46 in the housing 12.

An indicating means to indicate when excessive pressure is being applied to the housing 12 or the hand knob 42 is provided in this case by a noise indicating means. The surfaces of the carrier member 25 and the housing 12 are slightly roughened in the injection moulding process, and thus, when excessive pressure is applied so that the housing 12 and the carrier member 25 come into contact, the two roughened surfaces generate noise. This is an indication to the user to relax the pressure he is applying.

As can be seen, the diameter of the cleaning member 18, and accordingly, the outer diameter of the brush member 27 are approximately forty percent of the diameter of the compact disc record 2. In other words, the outer diameter of the brush member is approximately the radial length of the record from the rim of the central hole of the record to the peripheral edge of the compact disc. Furthermore, the radial width of the brush member 27 is substantially equal to the radial width of the unrecorded area of the compact disc, in other words, it is equal to the radial length from the rim of the central hole of the disc to the inner diameter of the area of the disc on which data is recorded, since there are only two points where the cleaning member can direct its cleaning action in a circumferential direction, namely, at the outer peripheral edge of the record, and at the inner portion of the record adjacent the central hole, by virtue of the fact that the width of the annular brush member 27 is the same as the width of the unrecorded portion, the circumferential component by cleaning motion adjacent the inner hole is therefore almost exclusively over the unrecorded portion of the disc, and scratching of this area does not present any problems. Additionally, by virtue of the fact that the rotational direction of the cleaning member is in the opposite direction to the housing of the device, the cleaning member has virtually no circumferential component of motion adjacent the outer periphery of the compact disc. Thus, virtually all the cleaning motion is directed in a substantially radial direction relative to the compact disc.

In this particular case the gear ratio achieved between the spindle and the cleaning member is 2.3:1 and this further facilitates in reducing the circumferential component of cleaning motion to zero at the outer peripheral edge of the compact disc.

Figures 1, 2, 3:
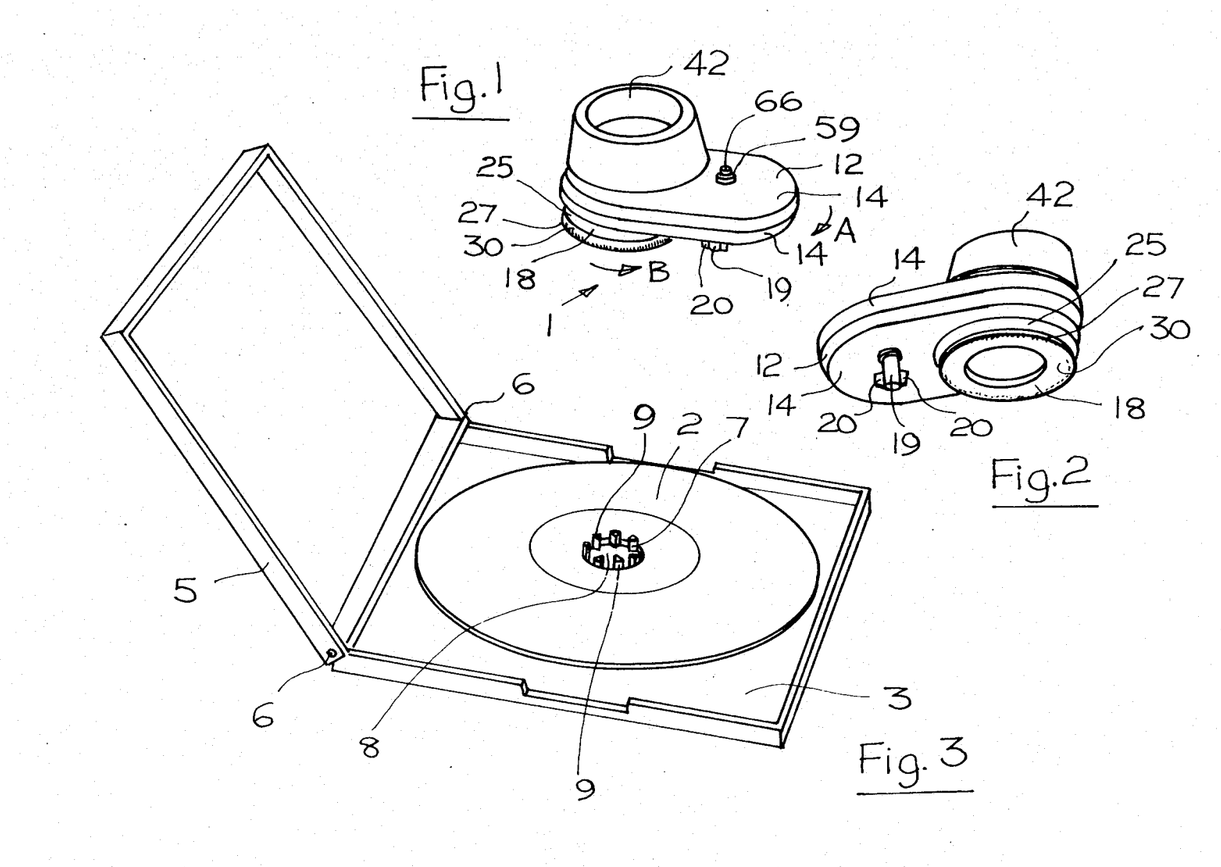
FIG. 1 is a perspective view of a disc record cleaning device according to the invention.
FIG. 2 is an underneath perspective view of the cleaning device of FIG. 1.
FIG. 3 is a perspective view of a compact disc in a compact disc casing.
Figures 4, 5:
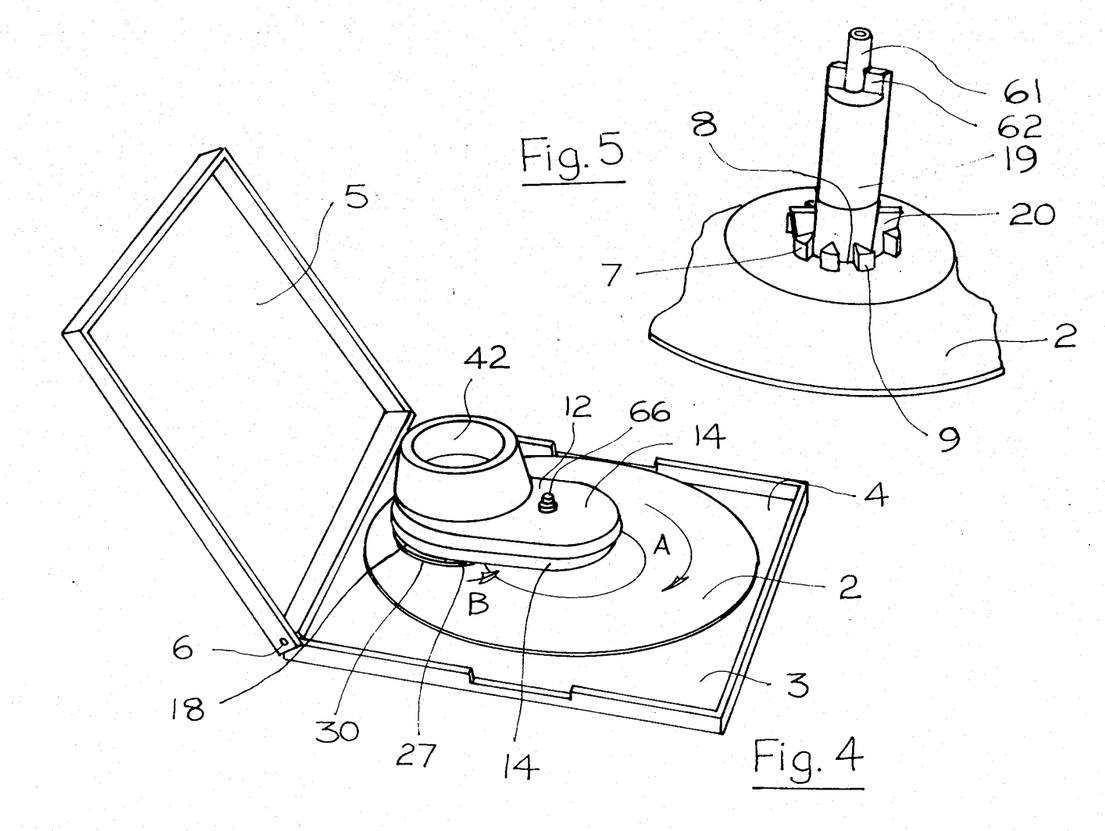
FIG. 4 is a perspective view of the cleaning device of FIG. 1 in use.
FIG. 5 is a perspective view of a detail of the cleaning device of FIG. 1 in use.
Figure 6:
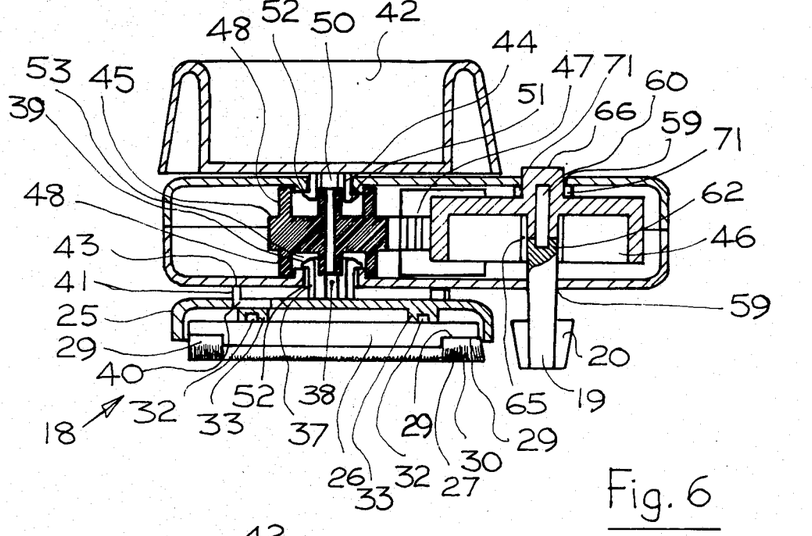
FIG. 6 is a cross sectional view of the cleaning device of FIG. 1.
Figure 7:
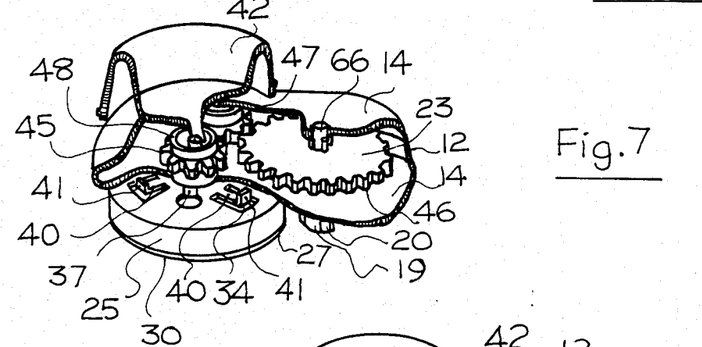
FIG. 7 is a partly cut-away perspective view of the cleaning device of FIG. 1.
Figure 8:
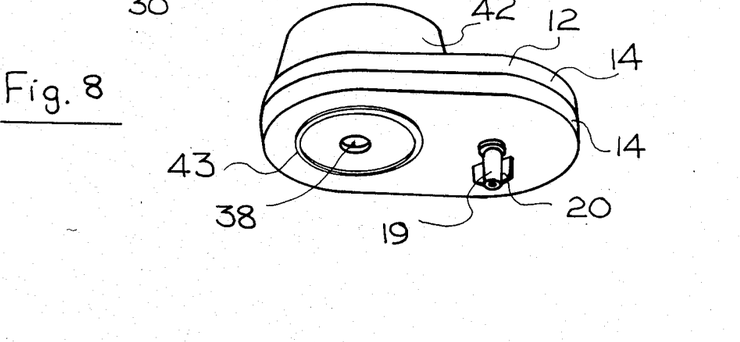
FIG. 8 is an underneath perspective view of the cleaning device of FIG. 1 with portion of the device removed.

In use, the compact disc record 2 is left in the case 3. The cleaning device is placed over the record with the spindle 19 engaging the opening 8 in the case 3. The splines 20 on the spindle 19 engage the splines 9 in the opening 8, thereby preventing rotation of the spindle 19. The knob 42 is gripped and the housing 12 is rotated in the direction of the arrow A around the spindle 19. As the housing 12 is rotated the spindle 19 and spindle gear 46 remains stationary thereby causing the intermediate gear 47 to rotate and in turn drive the cleaning member gear 45. This rotates the cleaning member 18 in the opposite direction, namely in the direction of the arrow B to the rotational direction of the housing 12. Thus, as can be seen in FIG. 4, the majority of the components of motion of the cleaning member 18, and in turn the bristles 30 relative to the compact disc record 2 are effectively radially directed across the record 2. This, thus, avoids circumferential scratching of the disc record.

As the user rotates the housing by gripping the knob 42, any change in the direction of the pressure the user is applying is compensated for by tilting of the carrier member relative to the housing. This it will be appreciated accommodates the movement of the users wrist as he rotates the device.

In most cases it is envisaged that prior to placing the cleaning device on the compact disc, a cleaning fluid will be applied to the brush member 27. Any suitable cleaning fluid may be used.

Should at any stage during the use of the cleaning device 1, it becomes necessary to replace the brush member 27, this can readily easily be done by merely releasing the existing brush support 26 from the carrier member 25 and replacing it with a new brush support 26 with a fresh brush member 27.

It will, of course, be appreciated that while a noise indicating means to indicate excessive pressure has been described, any other suitable means to indicate excessive pressure could be used. For example, in certain cases it is envisaged that noise may be generated by corresponding pips on the carrier and the housing, which would interengage each other in the event of excessive pressure. Needless to say, any other suitable means could be used, for example, electronic, electrical or the like. It will of course be appreciated that such indication means could be dispensed with altogether without departing from the scope of the invention. Further, it is envisaged that other resilient means besides the resilient leaf members could be used, for example, in certain cases spring loaded spuds extending upwardly from the carrier member or downwardly from the housing could be used. Indeed, in certain cases it is envisaged that resilient members may be provided on the housing.

It will also of course be appreciated that a housing of any other construction could be used as could a carrier member of any other cleaning member be used. It will of course be appreciated that it is not necessary for the cleaning member to be circular, nor indeed is it necessary for the brush to be annular, a rectangular, square, elongated or any other suitable shaped brush or cleaning member could be used. Needless to say, it will also be appreciated that the knob in certain cases could be dispensed with. It will be appreciated that while the device has been described as comprising a cleaning member driven by gears from a gear fixed relative to the record case and the record, this is not necessary. The cleaning member may, in certain cases, be connected to the knob, and as the housing is rotated the disc would similarly rotate. Alternatively, the cleaning disc could be driven by a means other than gears, for example, pulleys and belts, sprockets or chains, or any other suitable means. Needless to say, gear ratios other than 2.3:1 could be used to speed up or slow down the cleaning member relative to the rotational speed of the housing. In fact, in certain cases it is envisaged that the cleaning member may be driven directly from the central record-engaging member. In another case, it is envisaged that the spindle from the housing may directly engage the record for example, the central opening of the record, in which case the housing would be rotatable as already described, and the cleaning disc may either be fixed or rotatable on a spindle in the housing. Further, it will be appreciated that instead of a spindle to engage the record, any other means to permit the device to rotate relative to the record could be provided, for example, in certain cases it is envisaged that a hole could be provided in the housing to engage a spindle on which the disc record is rotatable. Further, in certain cases the spindle may be fast with the housing, and in other cases the cleaning member may be fast with the housing.

It will, of course, be appreciated that while the cleaning member has been described as a disc, it could be of any other suitable shape, configuration, or diameter. Further, it will be appreciated that, while advantageous, it is not necessary for the cleaning brush to be of annular shape, it could cover the entire disc, or the bristles could merely project from an elongated base member. Furthermore, the width of the brush member could be any other desired width than that described. Additionally, it will be appreciated that while the brush member has been described as being releasably connected to the brush support member, this is not necessary, it does however, have the advantage that where a brush wears out, it may be replaced without having to replace the entire device. Indeed, it is envisaged that in certain cases the brush member and brush support member could be supplied as a replaceable part for the device.

Further, in certain cases it is envisaged that where a gear train is used, the cleaning member gear could engage the spindle gear directly, thus dispensing with the need for an intermediate gear. In this case, the direction of rotation of the cleaning member would be similar to the direction of rotation of the housing.

It will, of course, be appreciated that while the cleaning device has been described as comprising a closed housing which is formed in two halves, any other suitable housing could be used. For example, in certain cases, it is envisagead that an open work housing, or a housing formed by a framework, a single base member, a body member or the like could be used.

Needless to say, while the device has been described as being constructed of injection moulded plastics, it could be constructed in any other suitable material, and may be either injection moulded, machine fabricated or the like.

Furthermore, it will be appreciated that while the device has been described for use with cleaning a compact disc record, it could be used for cleaning any disc record.

It will also of course be appreciated that the knob, if desired, may be dispensed with, or a knob or handle fast on the housing could be provided.

Furthermore, it will be appreciated that a cleaning member other than a brush member could be used, for example, a pad of cloth or fibrous material, whether synthetic or natural material, could be used, or indeed, in certain cases, a sponge may be provided. The advantage, however, of using a brush member is that scratching of the disc is greatly reduced because any particles of grit pass into the bristles of the brush and thus away from the surface being cleaned.

Additionally, it will be appreciated that while the carrier member is rotatably engaged in the housing by means of three fingers, any other suitable arrangement for rotatably mounting the carrier member in the housing could be provided. The main thing is that the carrier member should be free to tilt relative to the housing.

I claim:

1. A disc record cleaning device comprising:
a housing rotatable about a rotational axis which in use, coincides with the rotational axis of the record, and,
a cleaning member mounted in the housing to wipe the record as the housing rotates, the cleaning member being mounted in the housing for tilting relative to the housing.

2. A cleaning device as claimed in claim 1 in which the cleaning member is rotatably mounted in the housing about an axis spaced apart from the rotational axis of the housing, the rotational axis of the cleaning member being tiltable relative to the rotational axis of the housing.

3. A cleaning device as claimed in claim 2 in which a resilient member is mounted between the housing and the cleaning member to accommodate tilting of the cleaning member.

4. A cleaning device as claimed in claim 3 in which the cleaning member comprises a circular disc-like member, a plurality of resilient members being circumferentially spaced about the cleaning member.

5. A cleaning device as claimed in claim 4 in which a plurality of circumferentially spaced openings are provided in the cleaning member, and an elongated resilient member extends from the cleaning member into each opening, the free end of the resilient member extending upwardly to engage a bearing surface on the housing.

6. A cleaning device as claimed in claim 5 in which three openings are provided, spaced apart by 120° to each other.

7. A cleaning device as claimed in claim 2 in which a knob is rotatably mounted in the housing, the rotational axis of the knob intersecting the rotational axis of the cleaning member substantially at a point about which the cleaning member axis tilts.

8. A cleaning device as claimed in claim 2 in which indicating means is provided to indicate when the pressure being applied to the housing is excessive.

9. A cleaning device as claimed in claim 8 in which the indicating means is provided by roughening at least portion of the surface of the cleaning member and the housing so that when the two come into contact, a noise is generated.

10. A cleaning device as claimed in claim 2 in which the cleaning member comprises a brush member.

11. A cleaning device as claimed in claim 10 in which the brush member is releasably connected to the cleaning member.

12. A cleaning device as claimed in claim 10 in which the brush member is of annular shape, the radial width of the annular brush member being substantially similar to the radial width of the unrecorded area of the record.

13. A cleaning device as claimed in claim 10 in which the outer diameter of the brush member is substantially 40% of the diameter of the record, and the axes of the housing and the cleaning member are spaced apart a distance just less than half the diameter of the brush member.

14. A cleaning device as claimed in claim 2 in which a spindle rotatable in the housing extends from the housing to engage an opening in the central portion of a compact disc record case, the axis of the spindle coinciding with the rotational axis of the housing.

15. A cleaning device as claimed in claim 14 in which splines are provided on the spindle to engage corresponding splines on the opening in the disc record case.

16. A cleaning device as claimed in claim 14 in which drive transmission means are provided between the spindle and the cleaning member, to constrain the cleaning member to rotate in the opposite direction to that of the housing.

17. A cleaning device as claimed in claim 14 in which the cleaning device is adapted for cleaning a compact disc when in its case.

18. A cleaning device as claimed in claim 1 in which the cleaning member rotatably engages the housing by three circumferentially spaced fingers at 120°, which rotatably engage an opening in the housing, the fingers being slidable in the opening and engaging the opening with a snap-fit action.

19. A cleaning device for cleaning a compact disc in a standard compact disc case of the type in which a compact disc is normally sold, the compact disc case being of the type having a base to support the compact disc, a lid pivotal on the base, and a central portion in the base to engage the central hole of the compact disc, said central portion having an opening and splines extending upwardly from the rim of the opening to engage the compact disc, the cleaning device comprising:
a housing,
a spindle rotatable in the housing to engage the central opening in the compact disc case, the spindle defining an axis about which the housing is rotatable,
a cleaning member rotatably mounted on the housing about an axis spaced apart from the rotational axis of the housing, the rotational axis of the cleaning member being tiltable relative to the rotational axis of the housing, and
a resilient member mounted between the housing and the cleaning member to accommodate tilting of the cleaning member.

* * * * *